(12) United States Patent
Sato

(10) Patent No.: US 8,355,195 B2
(45) Date of Patent: Jan. 15, 2013

(54) ELECTROPHORETIC DISPLAY DEVICE AND ELECTRONIC APPARATUS

(75) Inventor: Takashi Sato, Chino (JP)

(73) Assignee: Seiko Epson Corporation, Tokyo (JP)

( * ) Notice: Subject to any disclaimer, the term of this patent is extended or adjusted under 35 U.S.C. 154(b) by 22 days.

(21) Appl. No.: 13/014,316

(22) Filed: Jan. 26, 2011

(65) Prior Publication Data

US 2011/0194170 A1    Aug. 11, 2011

(30) Foreign Application Priority Data

Feb. 8, 2010  (JP) .................................. 2010-025944

(51) Int. Cl.
  *G02B 26/00* (2006.01)
  *G02B 26/08* (2006.01)
  *G02F 1/29* (2006.01)
(52) U.S. Cl. ....................................... 359/290; 359/298
(58) Field of Classification Search .......... 359/290–292, 359/295, 296, 298
  See application file for complete search history.

(56) References Cited

U.S. PATENT DOCUMENTS

| | | | |
|---|---|---|---|
| 7,403,237 B2 * | 7/2008 | Iki | 349/43 |
| 7,834,842 B2 * | 11/2010 | Ikeda et al. | 345/107 |
| 2004/0150325 A1 * | 8/2004 | Yamakita et al. | 313/498 |
| 2006/0087719 A1 * | 4/2006 | Kosuge | 359/296 |
| 2007/0120812 A1 * | 5/2007 | Nagayama | 345/107 |
| 2009/0057681 A1 * | 3/2009 | Komatsu | 257/71 |
| 2010/0214513 A1 * | 8/2010 | Kang et al. | 349/86 |

FOREIGN PATENT DOCUMENTS

| | | | |
|---|---|---|---|
| JP | 2007-057722 | * | 3/2007 |
| JP | 2007-057722 A | | 3/2007 |

* cited by examiner

Primary Examiner — Thomas K Pham
Assistant Examiner — Brandi Thomas
(74) Attorney, Agent, or Firm — AdvantEdge Law Group, LLC

(57) ABSTRACT

An electrophoretic display device includes: a first substrate; a second substrate arranged to face the first substrate, an electrophoretic element arranged between the first substrate and the second substrate; a plurality of pixel electrodes formed on the surface of the electrophoretic element side of the first substrate; an opposing electrode formed on the surface of the electrophoretic element side of the second substrate and facing the plurality of pixel electrodes; a voltage line formed on the surface of the electrophoretic element side of the first substrate; and a partition wall having conductivity which is arranged between the first substrate and the second substrate and electrically connected to the voltage line.

16 Claims, 13 Drawing Sheets

ELECTROPHORETIC DISPLAY DEVICE AND ELECTRONIC APPARATUS

CROSS-REFERENCE TO RELATED APPLICATION

This application is based on and claims priority from Japanese Patent Application No. 2010-025944, filed on Feb. 8, 2010, the contents of which are incorporated herein by reference.

BACKGROUND

1. Technical Field

The present invention relates to an electrophoretic display device and an electronic apparatus.

2. Related Art

As an electrophoretic display device, an electrophoretic display device is known where electrophoretic particles are interposed between an element substrate and an opposing substrate. For example, the electrophoretic display device described in JP-A-2007-57722 discloses a method for increasing the retention ability of the electrophoretic particles and increasing the memory property of an image display by applying a voltage to a partition wall provided between the element substrate and the opposing substrate.

However, in JP-A-2007-57722, a detailed configuration, where the voltage is applied to the partition wall, is not described. For example, a method can be considered where the partition wall having conductivity is configured in the inside of a display section and is connected to a driving circuit at the outside of the display section. However, in the case of this method, since the connection point between the partition wall and the driving circuit is only at the outside of the display section, there is a concern that distortion in the partition wall voltage will be generated by resistance and capacity distribution in the display area, causing display defects.

In FIG. 16A, a state is shown where a positive voltage is applied to a pixel 40A on the left side of the diagram and a specific voltage G is applied to a pixel 40B on the right side of the diagram (the voltage G is also applied to a common electrode).

Here, white charge particles 127 are positively charged and are attracted to a negative side. A thickness h2 of an electrophoretic element 132 is normally approximately between 20 µm to 60 µm and is more than ten times different than a cell gap h1 of a liquid crystal layer 150 (approximately 3 µm). As a result, an inclined electrical field between a pixel electrode 135 and a common electrode 137 broadly affects the display. Although it also depends on the voltage, the length of the thickness of the material is more or less in the range where the liquid crystals are received by the display in the inclined electric field. That is, at approximately 30 µm to 60 µm from the original boundary of the pixels 40A and 40B, the influence of the adjacent pixels 40A (40B) causes the display to become abnormal.

As in FIG. 16B, if a conductive partition wall 170 is provided between the pixel 40A and the pixel 40B, the inclined electric field is absorbed here and does not leak to the adjacent pixels 40A and 40B. Due to this, it is possible to obtain a sharp display divided for each of the pixels 40A and 40B.

However, as described above, there is a problem that, since a voltage when writing and a final voltage are different if waveform distortions are generated in the partition wall voltage, a normal display is not possible.

SUMMARY

An advantage of some aspects of the invention is that an electrophoretic display device and an electronic apparatus are provided where it is possible to prevent generation of waveform distortions in the voltage applied to the partition wall and to perform a normal display.

The electrophoretic display device of the invention includes a first substrate, a second substrate arranged to face the first substrate, an electrophoretic element arranged between the first substrate and the second substrate, a plurality of pixel electrodes formed on the surface of the electrophoretic element side of the first substrate, an opposing electrode formed on the surface of the electrophoretic element side of the second substrate and facing the plurality of pixel electrodes, a voltage line formed on the surface of the electrophoretic element side of the first substrate and a partition wall having conductivity which is arranged between the first substrate and the second substrate and electrically connected to the voltage line.

According to the invention, the voltage line formed on the first substrate is connected to the partition wall having conductivity and applies a voltage to the partition wall. Since the partition wall and the voltage line are provided in the display section, generation of distortions in the partition wall voltage due to resistance and capacity distribution in the display section and the like is prevented. As a result, it is possible to perform normal display.

Also, it is preferable if an insulator is arranged between the partition wall and a common electrode.

According to the invention, it is possible to insulate the common electrode and the partition wall, and it is not necessary to apply the same voltage as the common electrode to the partition wall, so that it is possible to apply an arbitrary voltage to the partition wall.

Also, it is preferable if the surface of the partition wall is covered by the insulator.

According to the invention, it is possible to prevent changes in the partition wall over time due to the applied voltage.

Also, it is preferable if, on the surface of the electrophoretic element side of the first substrate, there is a plurality of scanning lines and a plurality of data lines which extend in directions which intersect each other, and the voltage line extends in parallel to at least any one of the scanning lines and the data lines.

According to the invention, it is possible to form the voltage line at the same time as the scanning lines or the data lines so that manufacturing becomes easy.

Also, it is preferable if a relay electrode is provided which is connected to the voltage line on the first substrate and the voltage line is connected to the partition wall via the relay electrode.

According to the invention, since the voltage line is connected to the partition wall via the relay electrode, it is possible to prevent disconnections and the like and maintain the connected state for a long period of time.

Also, it is preferable if the relay electrode is formed in the same layer as the pixel electrodes.

According to the invention, it is possible to form the relay electrode and the pixel electrodes in the same process so that it is not necessary to separately provide a process for forming the relay electrode.

Also, it is preferable if the partition wall is black.

According to the invention, since the partition wall is black, it is possible to obtain a display with high contrast.

Also, it is preferable if the partition wall and the voltage line are connected at a plurality of connection points provided for each pixel.

According to the invention, since the partition wall and the voltage line are connected at the plurality of connection points provided for each pixel, it is possible to reliably apply a voltage to the partition wall.

Also, it is preferable if the partition wall is formed to surround the pixel electrodes in a planar view.

According to the invention, since each of the pixels is partitioned by the partition wall, mixing of colors between the pixels and the like is prevented.

The electronic apparatus of the invention includes the electrophoretic display device of the invention.

Since the electronic apparatus of the invention is provided with a display section which is capable of preventing the generation of waveform distortions in the voltage applied to the partition wall and performing a normal display, it is possible to execute a sharp color display divided for each of the pixels.

BRIEF DESCRIPTION OF THE DRAWINGS

The invention will be described with reference to the accompanying drawings, wherein like numbers reference like elements.

DESCRIPTION OF EXEMPLARY EMBODIMENTS

Below, an embodiment of the invention will be described with reference to the diagrams. In addition, in each of the diagrams used in the description below, since each member is set to a recognizable size, the reduction scale of each member is appropriately changed.

First Embodiment

Figure 1A:
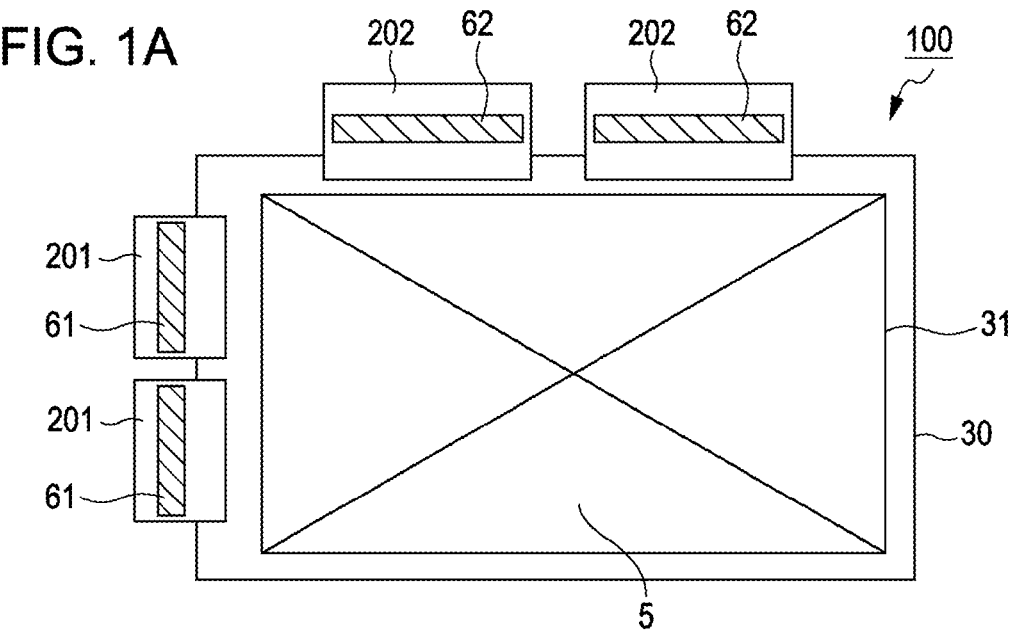
FIGS. 1A and 1B are diagrams illustrating an entire configuration of an electrophoretic display device of a first embodiment.

FIG. 1A is a planar diagram illustrating an entire configuration of an electrophoretic display device 100.

As shown in FIG. 1A, in the electrophoretic display device 100 of the embodiment, an element substrate 30 has a planar dimension larger than an opposing substrate 31, and on the element substrate 30 which protrudes more to the outside than the opposing substrate 31, two scanning line driving circuits 61 and two data line driving circuits 62 are COF (chip on film) mounted (or TAB (tape automated bonding) mounted) on flexible substrates 201 and 202 which are for connection with an external device. In addition, the flexible substrate 201 with the scanning line driving circuit 61 mounted thereon is mounted through ACP (anisotropic conductive paste), ACF (anisotropic conductive film) or the like in a terminal formation region formed in a periphery portion along one short side of the element substrate 30. Here, the element substrate 30 corresponds to the first substrate and the opposing substrate 31 corresponds to the second substrate.

Also, the flexible substrate 202 with the data line driving circuit 62 mounted thereon is mounted through ACP, ACF or the like in a terminal formation region formed in a periphery portion along one long side of the element substrate 30. In each of the terminal formation regions, a plurality of connection terminals is formed, and the scanning lines and the data lines described later which extend from a display section 5 are connected to each of the connection terminals.

Also, the display section 5 is formed in a region where the element substrate 30 and the opposing substrate 31 overlap. The lines that extend from the display section 5 (scanning lines 66 and data lines 68) extend to a region where the scanning line driving circuit 61 and the data line driving circuit 62 are connected on the flexible substrates 201 and 202 and are connected to the connection terminals formed in the formation region. In addition, the connection terminals are mounted to the flexible substrates 201 and 202 through ACP or ACF.

Figure 1B:
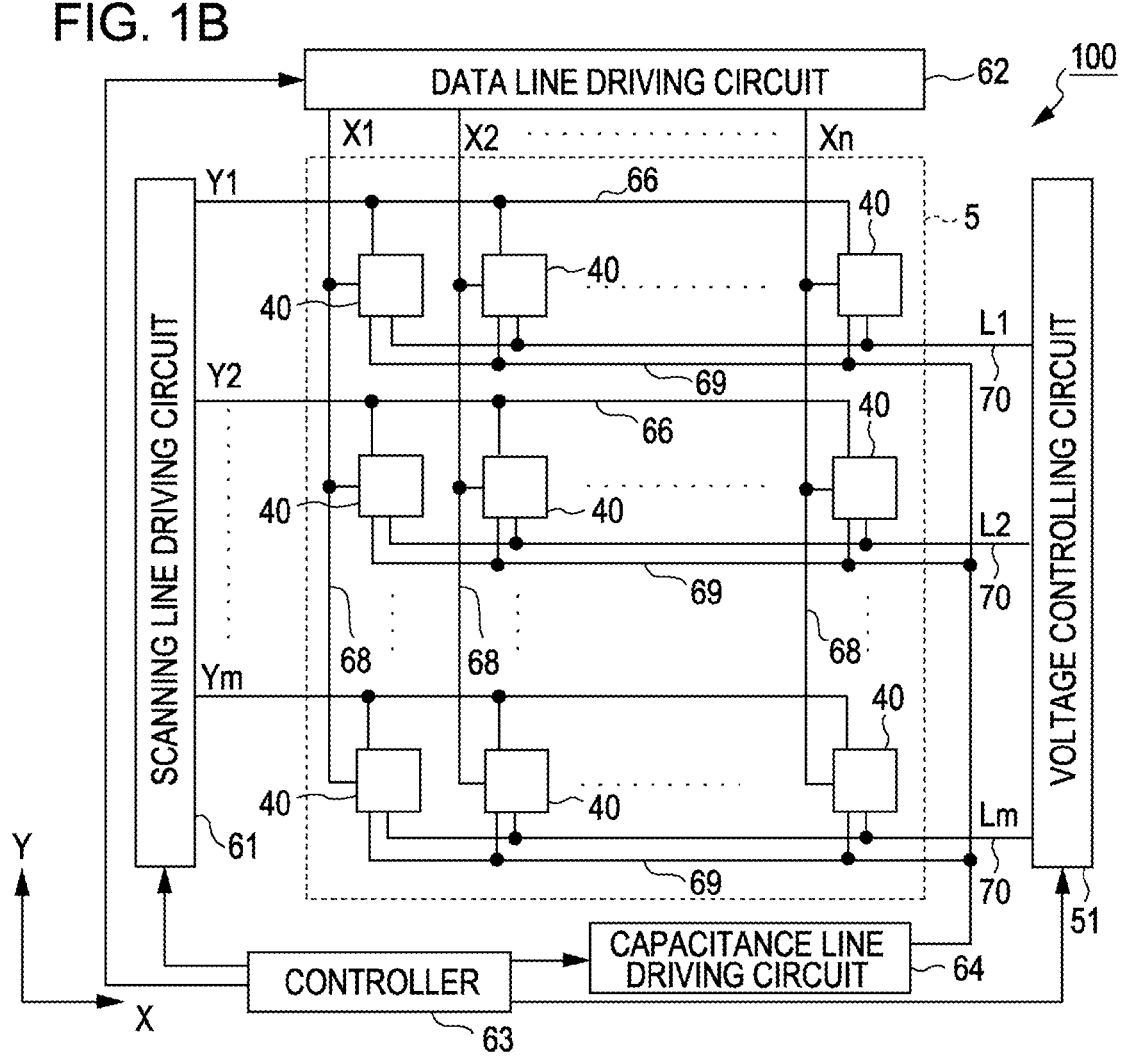

FIG. 1B is an equivalent circuit diagram illustrating an entire configuration of the electrophoretic display device.

As shown in FIG. 1B, in the display section 5 of the electrophoretic display device 100, a plurality of pixels 40 are arranged in a matrix shape. In the periphery of the display section 5, the scanning line driving circuit 61, the data line driving circuit 62, a controller 63, a capacitance line driving circuit 64 and a voltage controlling circuit 51 are arranged. The scanning line driving circuit 61, the data line driving circuit 62, the capacitance line driving circuit 64 and the voltage controlling circuit 51 are each connected to the controller 63. The controller 63 comprehensively controls the circuits based on image data and synchronization signals supplied from higher-level devices.

In the display section 5, a plurality of scanning lines 66 which extend from the scanning line driving circuit 61 and a plurality of data lines 68 which extend from the data line driving circuit 62 are formed and the pixels 40 are provided corresponding to intersection positions of the lines. Also, holding capacitance lines 69 which extend from the capacitance line driving circuit 64 are provided and each of the lines is connected to the pixels 40.

The scanning line driving circuit 61 is connected to each of the pixels 40 via the m scanning lines 66 (Y1, Y2, . . . , Ym) and under the control of the controller 63, the first to the m$^{th}$ scanning line 66 are sequentially selected and selection signals, which stipulate the on timing of selection transistors TR1 (refer to FIG. 2) provided in the pixels 40, are supplied via the selected scanning lines 66. The data line driving circuit 62 is connected to each of the pixels 40 via the n data lines 68 (X1, X2, . . . , Xn) and under the control of the controller 63, image signals, which stipulate the pixel data corresponding to each of the pixels 40, are supplied to the pixels 40.

The voltage controlling circuit 51 is connected to a partition wall 72 via the m partition wall voltage lines 70 (L1, L2, . . . , Lm) and under the control of the controller 63, various signals to be supplied to each of the partition wall voltage lines 70 are generated.

The capacitance line driving circuit 64 supplies a specific potential to the holding capacitance lines 69 under the control of the controller 63.

Figure 2:
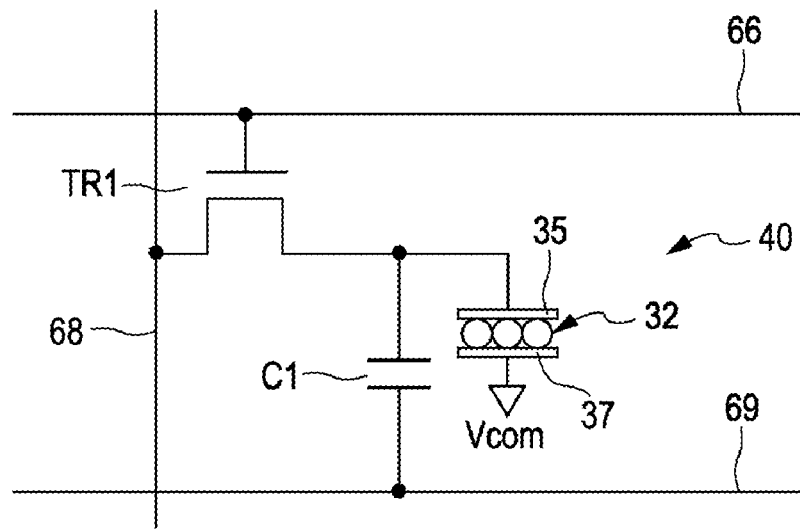
FIG. 2 is a circuit configuration diagram of one pixel of the electrophoretic display device of the first embodiment.

FIG. 2 is a circuit configuration diagram of the pixel 40.

In the pixel 40, the selection transistor TR1, a pixel electrode 35, an electrophoretic element 32, a common electrode 37 and a holding capacitor C1 are provided. Also, in the pixel 40, the scanning line 66, the data line 68 and the holding capacitance line 69 are connected. The scanning line 66 is connected to the gate of the selection transistor TR1, the data line 68 is connected to the source of the selection transistor TR1, and the pixel electrode 35 and one electrode of the holding capacitor C1 are connected to the drain of the selection transistor TR1. The other electrode of the holding capacitor C1 is connected to the holding capacitance line 69.

In addition, in the case of the embodiment, the selection transistor TR1 is a N-MOS (negative channel metal oxide semiconductor) transistor, but the N-MOS transistor may be replaced with a different type of switching element with the same function as the N-MOS transistor. For example, a P-MOS transistor may be used instead of the N-MOS transistor, or an inverter or a transmission gate may be used.

In the pixel 40, when the selection transistor TR1 is set in an on state due to a selection signal input via the scanning line 66, an image signal is input into the pixel electrode 35 from the data line 68 via the selection transistor TR1 and the holding capacitor C1 is charged. Then, the pixel electrode 35 is held at a specific potential level due to energy which has accumulated in the holding capacitor C1, and the electrophoretic element 32 is driven due to the difference in the potential of the pixel electrode 35 and the common electrode 37.

Figure 3:
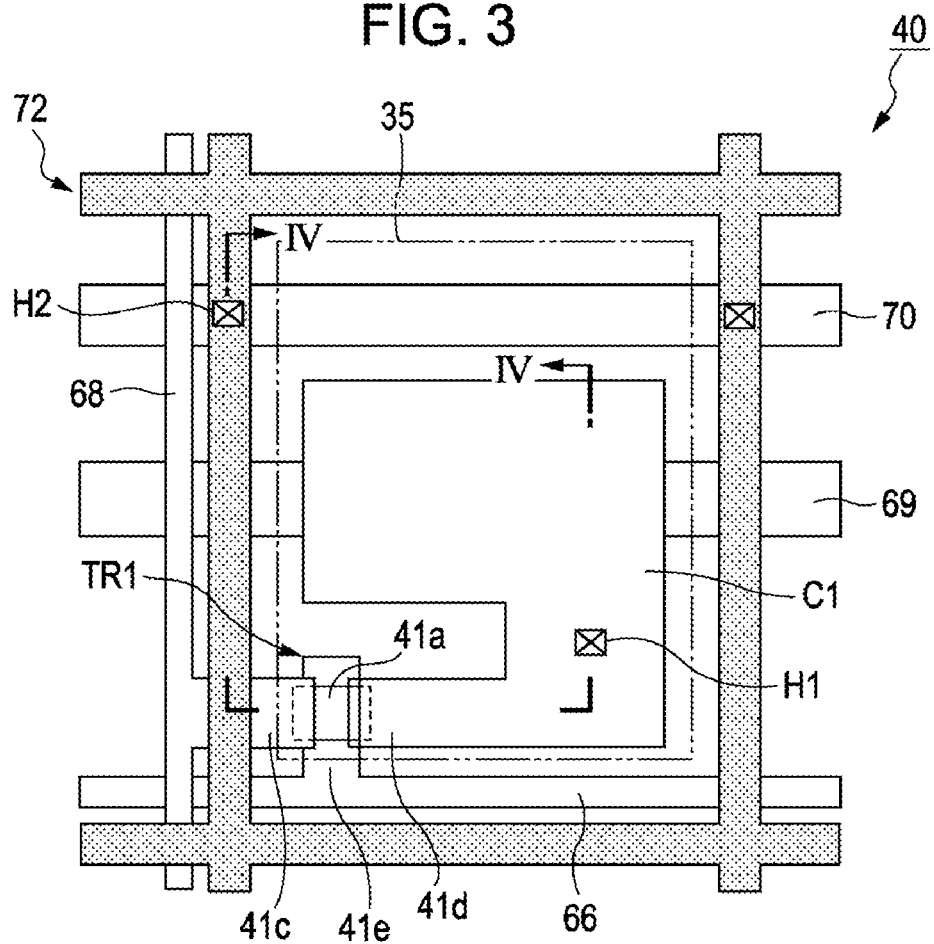
FIG. 3 is a planar diagram of one pixel of the electrophoretic display device of the first embodiment.
Figure 4:
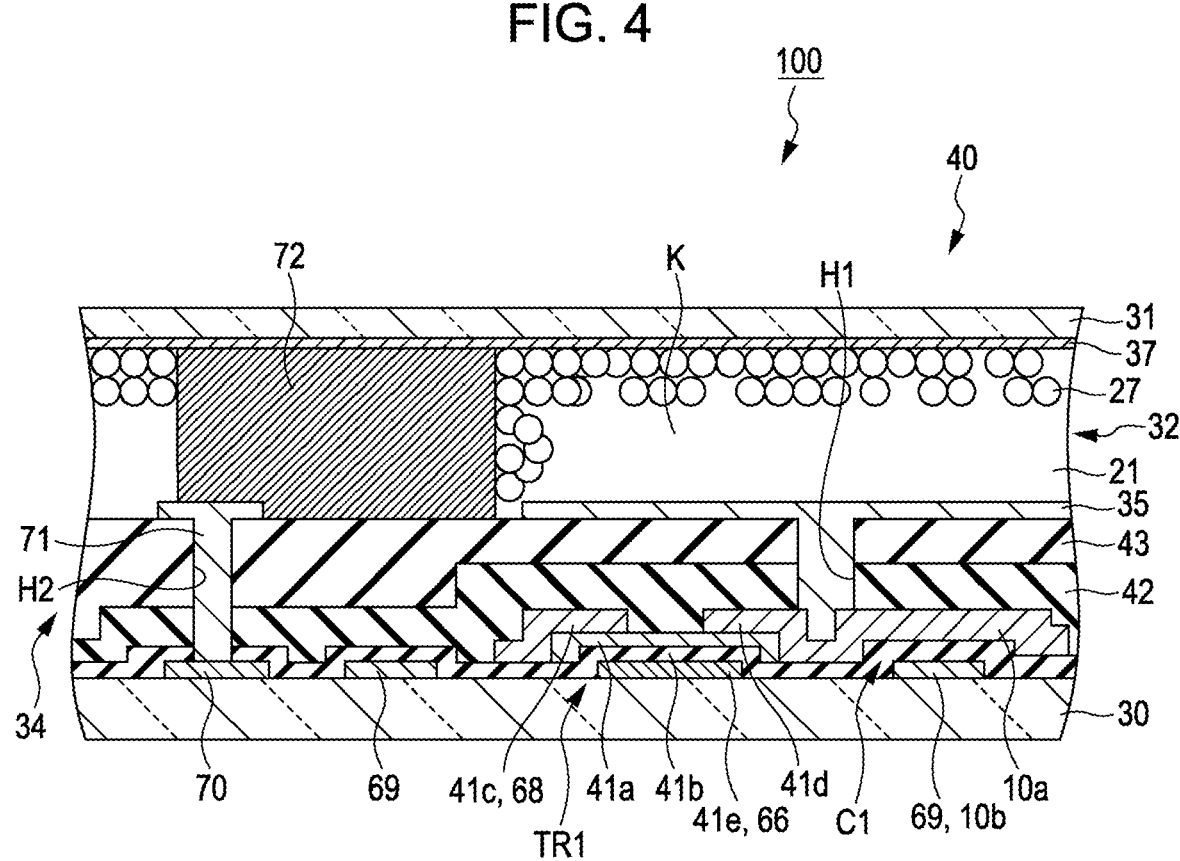
FIG. 4 is a cross-sectional diagram taken along a line IV-IV of FIG. 3.

FIG. 3 is a planar diagram illustrating a configuration of one pixel of the electrophoretic display device 100. FIG. 4 is a cross-sectional diagram taken along a line IV-IV of FIG. 3.

As shown in FIGS. 3 and 4, the electrophoretic display device 100 of the embodiment is provided with a configuration where the electrophoretic element 32 is interposed between the element substrate 30 and the opposing substrate 31. Specifically, the common electrode 37 is formed on the substrate surface of the electrophoretic element 32 side of the opposing substrate 31, and a circuit layer 34 is formed on the substrate surface on the electrophoretic element 32 side of the element substrate 30. The electrophoretic element 32 is divided into a plurality of regions by a partition wall 72 arranged between the element substrate 30 and the opposing substrate 31.

The element substrate 30 is a substrate formed from glass, plastic or the like, and may be a substrate which is not transmissive as it is arranged on the side opposite to the image display surface. On the element substrate 30, the circuit layer 34, which includes the pixel electrode 35, the scanning line 66, the data line 68, the selection transistor TR1, the holding capacitance line 69, the partition wall voltage line 70 and the like, is formed.

Specifically, on the substrate surface of the element substrate 30, a gate electrode 41e (scanning line 66), the holding capacitance line 69 and the partition wall voltage line 70 are formed from aluminum (Al) with a thickness of 300 nm. The partition wall voltage line 70 extends in parallel with the scanning line 66 and the holding capacitance line 69. Then, a gate insulating film 41b with a thickness of 200 nm, which is formed from a silicon oxide or a silicon nitride, is provided so as to cover the gate electrode 41e (scanning line 66), the holding capacitance line 69 and the partition wall voltage line 70. A semiconductor layer 41a is provided at a position where the gate insulating film 41b and the gate electrode 41e overlap, and a source electrode 41c and a drain electrode 41d are formed so that a portion is on the semiconductor layer 41a. The semiconductor layer 41a of the embodiment is formed by a semiconductor material formed from amorphous silicon hydride.

Also, the holding capacitor C1 is formed at a position where the pixel electrode 35 and the holding capacitance line 69 overlap. One electrode 10a of the holding capacitor C1 is connected to the drain electrode 41d and the other electrode 10b is connected to the holding capacitance line 69.

Also, on the selection transistor TR1, a first interlayer insulating film 42 and a second interlayer insulating film 43 are formed by being laminated in this order. The first interlayer insulating film 42 is formed from a silicon oxide film with a thickness of 100 nm and a silicon nitride film with a thickness of 300 nm, and the second interlayer insulating film 43 is formed from acrylic with a thickness of 1 μm. The second interlayer insulating film 43 functions as a planarization film.

The pixel electrode 35 formed on the surface of the second interlayer insulating film 43 is connected to the drain electrode 41d via a contact hole H1 formed in the first interlayer insulating film 42 and the second interlayer insulating film 43. On the surface of the second interlayer insulating film 43, a relay electrode 71 is formed along with the pixel electrode 35.

The relay electrode 71 is connected to the partition wall voltage line 70 via a contact hole H2 (connection point) formed by penetrating through the first interlayer insulating film 42, the second interlayer insulating film 43 and the gate insulating film 41b. In the embodiment, the relay electrode 71 is formed from the same material as the pixel electrode 35 but is not limited to this. The relay electrode 71 is formed for each of the pixels 40.

The pixel electrode 35 and the relay electrode 71 are electrodes formed by laminating nickel plating and gold plating in this order on Cu foil or from Al, ITO (indium tin oxide) or the like.

Then, on the second interlayer insulating film 43, the partition wall 72 is formed to come into contact with the relay electrode 71.

The partition wall 72 is a partition wall with a grid shape in a planar view, which is formed having a constant height in a thickness direction of the electrophoretic element 32 and partitions (divides) up a plurality of sealed spaces K, and is configured from a material having conductivity. As a material of the partition wall 72, for example, a material where carbon is mixed with photoactive polyimide can be used. By making the partition wall 72 be black, a display with high contrast is obtained.

The partition wall 72 is formed to surround the pixel electrode 35 in a planar view and each pixel is partitioned.

The space on the inside of the frame-shaped partition wall 72 is divided into the plurality of sealed spaces K with a matrix shape, and each of the sealed spaces K are sealed in an air tight manner between the partition wall 72, the opposing substrate 31 and the element substrate 30. In the sealed spaces K, a black dispersion medium 21 and a plurality of white charge particles 27 which configure the electrophoretic element 32 are sealed therein, and each of the charge particles 27 can move within the sealed spaces K. The white charge particles 27 are formed from titanium oxide.

The partition wall 72 is connected to a plurality of the partition wall voltage lines 70 formed on the element substrate 30 via a plurality of the relay electrodes 71 formed for each of the pixels 40.

In the opposing substrate 31, the common electrode 37 (opposing electrode), which is formed from ITO with a thickness of 50 nm on a transmissive substrate formed from PET with a thickness of 0.5 mm, is provided.

The opposing substrate 31 is a transmissive substrate to be arranged on the image display side. The common electrode 37 is an electrode where a voltage is applied to the electrophoretic element 32 along with the pixel electrode 35 and is a transmissive electrode formed from MgAg (an alloy of magnesium and silver), ITO (indium tin oxide), IZO (indium zinc oxide) or the like.

Then, the element substrate 30 and the opposing substrate 31 are joined through the partition wall 72.

In the embodiment, there is a configuration where the partition wall 72 and the common electrode 37 come in contact and have the same potential.

Next, the manufacturing method of the electrophoretic display device 100 will be described.

FIGS. 5A to 6H are partial cross-sectional diagrams illustrating manufacturing processes of the electrophoretic display device.

Figure 5A:
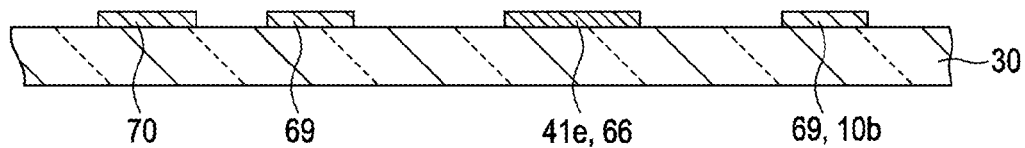
FIGS. 5A to 5D are partial cross-sectional diagrams illustrating manufacturing processes of the electrophoretic display device of the first embodiment.

As shown in FIG. 5A, on the element substrate 30 formed from a glass substrate with a thickness of 0.5 mm, the holding capacitance line 69, the gate electrode 41e (scanning line 66), and the partition wall voltage line 70 are formed from Al with a thickness of 300 nm. Depositing is performed using a sputtering method and a pattern is formed using a photo-etching method.

Figure 5B:
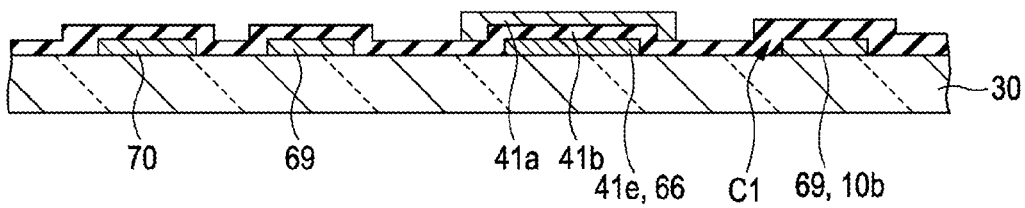

As shown in FIG. 5B, the gate insulating film 41b is formed to cover the gate electrode 41e (scanning line 66), the holding capacitance line 69 and the partition wall voltage line 70. The gate insulating film 41b is formed as the gate insulating film 41b using a plasma CVD method from a silicon nitride film with a thickness of 400 nm. Next, on the gate insulating film 41b, a non-doped amorphous silicon film with a thickness of 90 nm and an n+ amorphous silicon film with a thickness of 50 nm are formed and are processed into an island shape using a photo-etching process so as to partially remain on the gate electrode 41e. The etching is performed using dry etching including fluorine or chlorine.

Figure 5C:
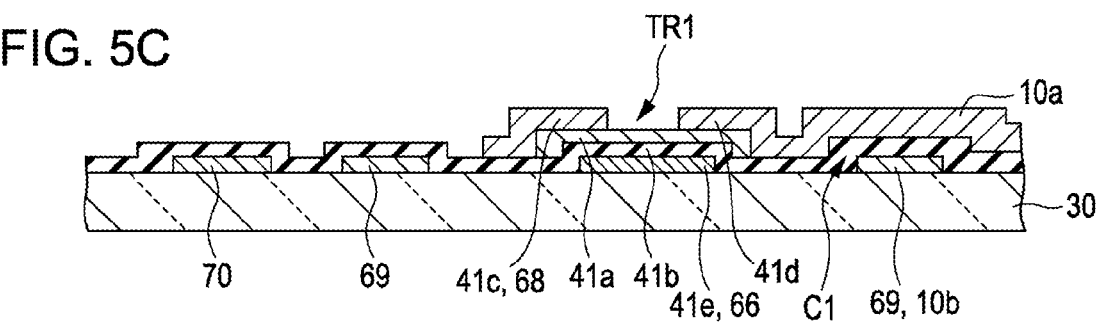

As shown in FIG. 5C, an aluminum (Al) film with a thickness of 300 nm is deposited on the entire surface of the gate insulating film 41b using a sputtering method, and the source electrode 41c (data line 68) and the drain electrode 41d (one electrode 10a of the holding capacitor C1) are formed by patterning the aluminum film using a photo-etching method. The etching is performed using wet etching. In this manner, the selection transistor TR1 is configured.

Figure 5D:
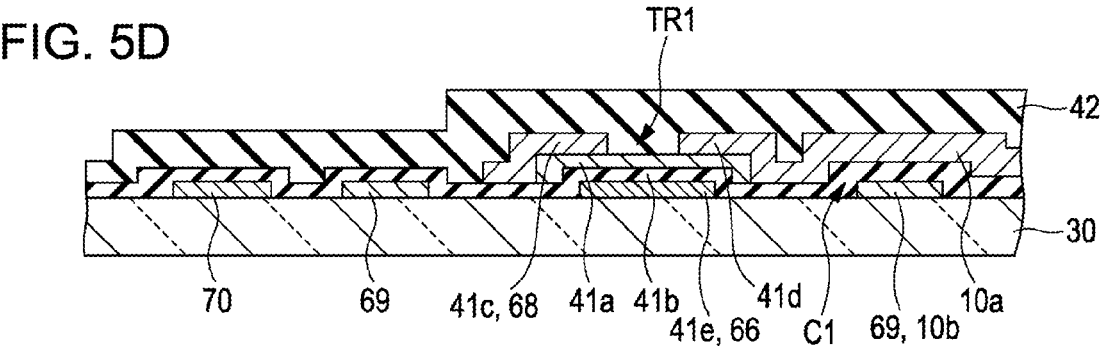

As shown in FIG. 5D, a silicon nitride film with a thickness of 500 nm is formed as the first interlayer insulating film 42 using a plasma CVD method.

Figure 6E:
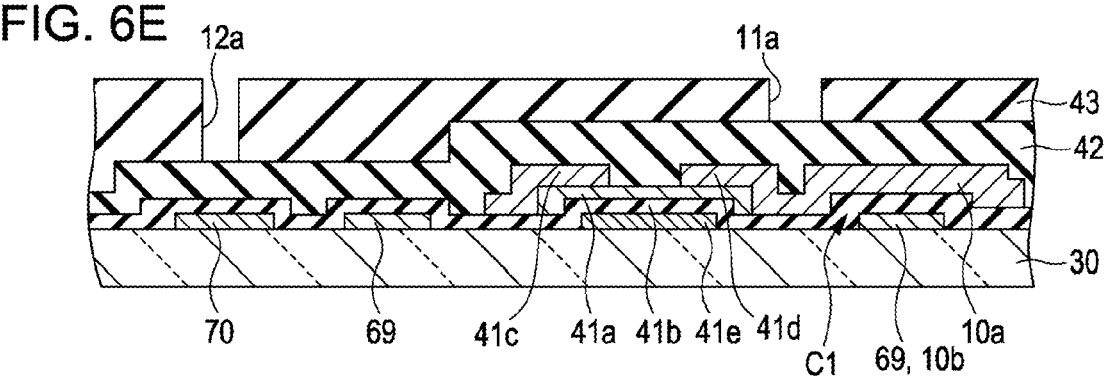
FIGS. 6E to 6H are partial cross-sectional diagrams illustrating manufacturing processes of the electrophoretic display device of the first embodiment.

As shown in FIG. 6E, the second interlayer insulating film 43 is formed by coating photosensitive acrylic resin on the first interlayer insulating film 42 using a spin coating method. After this, the second interlayer insulating layer 43 on the drain electrode 41d and the partition wall voltage line 70 is partially exposed and developed and through holes 11a and 12a are formed.

Figure 6F:
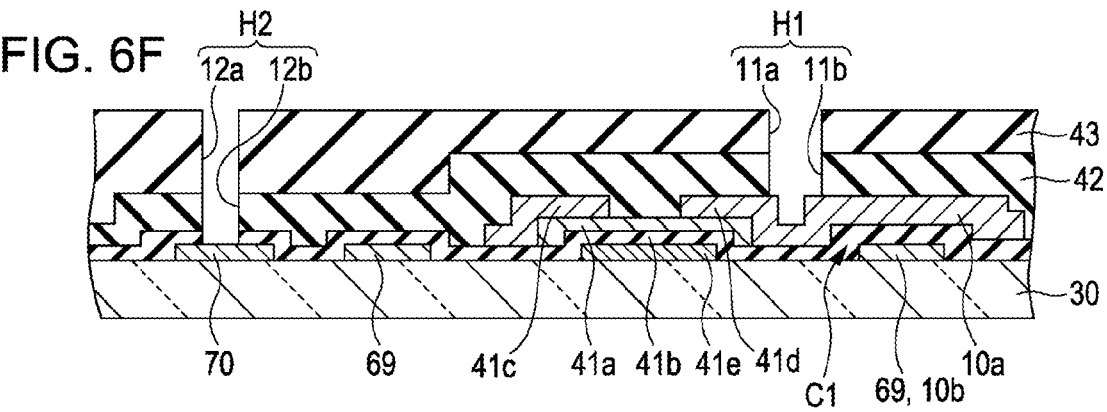

As shown in FIG. 6F, with the second interlayer insulating film 43 as a mask, the first interlayer insulating film 42 and the gate insulating film 41b on the drain electrode 41d and the partition wall voltage line 70 are removed using dry etching, and the contact holes H1 and H2 are obtained by forming through holes 11b and 12b which partially expose the drain electrode 41d and the partition wall voltage line 70.

Figure 6G:
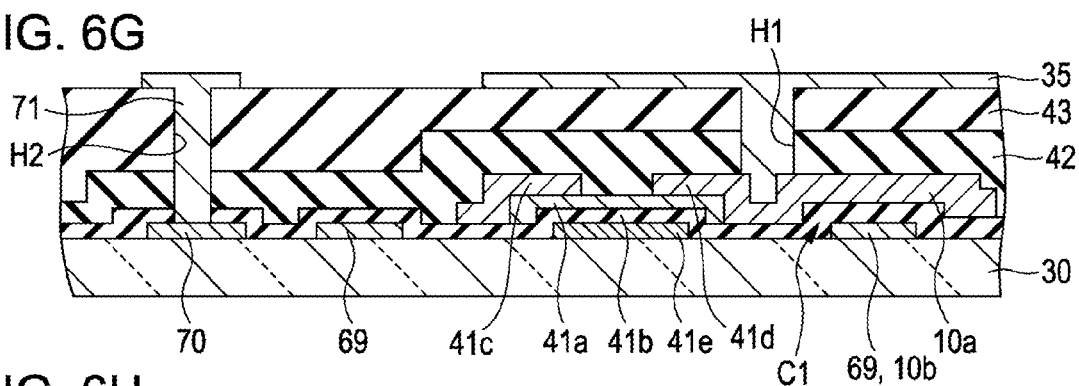

As shown in FIG. 6G, an ITO film with a thickness of 50 nm is deposited on the entire surface of the second interlayer insulating film 43 using a sputtering method. By performing patterning using a photo-etching method, the pixel electrode 35, which is connected to the drain electrode 41d via the contact hole H1, and the relay electrode 71, which is connected to the partition wall voltage line 70 via the contact hole H2, are formed.

Figure 6H:
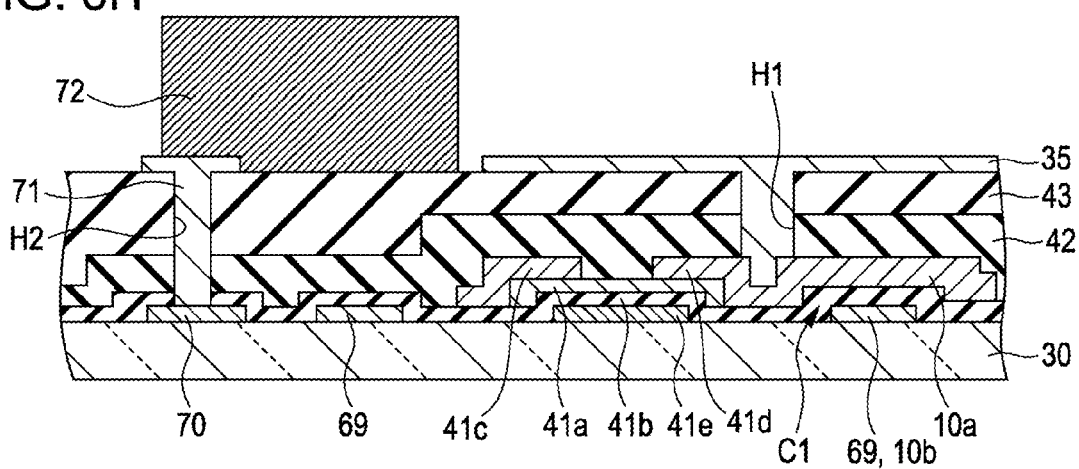

As shown in FIG. 6H, the partition wall 72 is formed in a grid shape so as to come into contact with the relay electrode 71. After a material having conductivity, in which carbon is mixed with photoactive polyimide, is coated on the substrate using a spin coating method, by exposing, developing and firing, the partition wall 72 having conductivity is formed. A specific resistance which is in the order of $10^{-4}$ Ωcm is used.

After this, after a mixture of the white charge particles 27 in the black dispersion medium 21 as an electrophoretic material is arranged in the spaces (pixels) surrounded by the partition wall 72 formed on the element substrate 30, by joining together the element substrate 30 and the opposing substrate 31, the electrophoretic display device 100 of the embodiment as shown in FIG. 4 is completed.

In this manner, in the electrophoretic display device 100 of the embodiment, the partition wall voltage lines 70 are formed in the same layer as and extend in parallel to the scanning lines 66 and the holding capacitance lines 69. The partition wall voltage lines 70 are connected to the partition wall 72 having conductivity via the relay electrodes 71 and apply a voltage to the partition wall 72. The inclined electric fields generated between the adjacent pixel electrodes 35 are shielded by the partition wall 72 and do not leak to the adjacent pixels 40 so that there is no effect on the display.

As a result, the electrophoretic display device 100 is capable of preventing the generation of waveform distortions in the voltage applied to the partition wall 72 and performing a normal display.

In the embodiment, since the partition wall 72 and the common electrode 37 come into contact with each other and have the same potential, the voltage applied to the partition wall 72 depends on the voltage applied to the common electrode 37. Also, since the partition wall 72 and the common electrode 37 only come into contact with each other and are not attached to each other, the configuration is set so that the relay electrodes 71 and the partition wall voltage lines 70 are provided on the element substrate 30 side and it is possible to reliably apply a voltage to the partition wall 72 via the relay electrodes 71 and the partition wall voltage lines 70.

In this manner, it is possible to prevent the leaking out of an inclined electric field between the adjacent pixels 40 by providing the conductive body of the partition wall 72 between the pixels 40 and obtain a sharp display divided for each pixel. In the embodiment, since the partition wall 72 and the partition wall voltage lines 70 are connected in the display section 5, the generation of waveform distortion in the partition wall voltage is prevented and a normal display can be performed.

The partition wall 72 with a grid shape in a planar view is connected to the partition wall voltage lines 70 via the relay electrodes 71 provided for each of the pixels 40. That is, since there is connection at a plurality of connection points on the element substrate 30 side, even if the partition wall 72 and the common electrode 37 are not joined, it is possible to reliably apply a voltage to the partition wall 72 from the partition wall voltage lines 70 and not from the common electrode 37 side.

In addition, it is not necessary to limit the selection transistor TR1 to using amorphous silicon, and polysilicon, a semiconductor oxide, or an organic semiconductor material may be used. Also, the configuration is not limited to a bottom gate structure but may be a top gate structure.

Also, it is not necessary to limit each type of depositing method to those described above, and printing methods such as an ink jet method, a coating method or the like may be used. In this case, it is possible to carry out formation only in the required region.

Also, the partition wall voltage lines 70 are formed in the same layer as the scanning lines 66. In this case, since it is possible to form the lines such as the scanning lines 66 in the same process, it is not necessary to add a process for forming the partition wall voltage lines 70.

Also, the partition wall voltage lines 70 may be formed in the same layer as the data lines 68 and not formed in the same layer as the scanning lines 66. In this case, since it is possible to form the lines which form the selection transistor TR1 in the same process, it is not necessary to add a process for forming the partition wall voltage lines 70.

Also, in the embodiment, the partition wall 72 and the partition wall voltage lines 70 are connected via the relay electrodes 71 formed in the contact holes H2. However, it may be configured so that the partition wall 72 and the partition wall voltage lines 70 are directly connected.

Also, the contact holes H1 and H2 may not be through holes partially formed in the first interlayer insulating film 42 and the second interlayer insulating film 43 after the films are formed, but the contact holes H1 and H2 may be where depositing was not performed only in places corresponding to the contact holes H1 and H2 when forming the first interlayer insulating film 42 and the second interlayer insulating film 43.

Also, it is not necessary to limit the specific resistance of the material used in the partition wall 72 to be in the order of $10^{-4}$ Ωcm. The specific resistance which is from $10^{-6}$ Ω to $10^7$ Ωcm may be used. In general, an object with a specific resistance of $10^8$ Ωcm or more is often referred to as an insulator. However, in this range, the inclined electric field leaks to the adjacent pixel and it is not possible to perform a normal display. Also, the time constant of the partition wall 72 also becomes large and this effect also becomes large so that there is crosstalk and a reduction in contrast. As a result, the partition wall 72 is configured using a material with a specific resistance smaller than $10^8$ Ωcm.

Also, by making the partition wall 72 black, it is possible to obtain a display with high contrast. In addition, the material of the partition wall 72 is not limited to that described above, but since a display with high contrast is possible, it is preferable to form the partition wall 72 in a color as close as possible to black.

Also, the partition wall 72 is not limited to a grid shape but may be formed, for example, along the scanning lines 66 or the data lines 68.

Also, the color of the dispersion medium 21 is not limited to black and the color of the charge particles is not limited to white. For example, a plurality of charge particles which have different colors (R, G, B) may be dispersed for each pixel. Two particles charged as positive and negative may be held in a solvent in one pixel. Also, particles with no charge may be held in a solvent.

Also, in the embodiment, the electrophoretic element 32 is a configuration where the dispersion medium 21 and charge particles 27 are sealed in the sealed spaces K sealed by the partition wall 72. However, a capsule-type electrophoretic element may be used where a plurality of microcapsules with the dispersion medium 21 and charge particles 27 sealed therein is provided.

Second Embodiment

Next, an electrophoretic display device of a second embodiment will be described.

Figure 7:
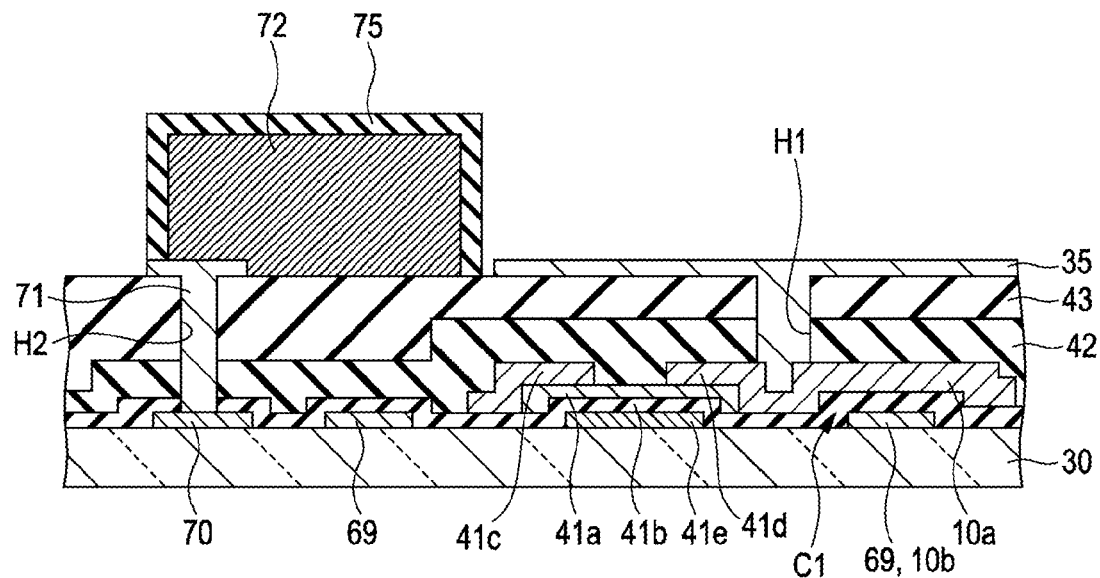
FIG. 7 is a cross-sectional diagram illustrating an entire configuration of an electrophoretic display device of a second embodiment.

FIG. 7 is a cross-sectional diagram illustrating an entire configuration of the electrophoretic display device of the second embodiment.

In the first embodiment described earlier, due to the configuration where the partition wall 72 and the common electrode 37 come into contact and have the same potential, the inclined electric field generated between the adjacent pixel electrodes 35 is shielded by the partition wall 72 and does not leak to the adjacent pixels so that there is no effect on display. However, as shown in FIG. 4, since the white charge particles 27 collect around not only the opposing substrate 31 side but also the perimeter of the partition wall 72, there is a problem that the charge particles 27 that collect at the partition wall 72 side do not contribute to the display.

Here, in an electrophoretic display device 200 of the second embodiment, there is a configuration where the surface of the partition wall 72 as shown in FIG. 7 is covered by an insulating covering layer 75 (insulator). As a material for the insulating covering layer 75, acrylic and the like can be used.

In the forming of the insulating covering layer 75, after the partition wall 72 is formed on the element substrate 30, acrylic is coated by spin coating so as to cover the surface of the partition wall 72 and patterning is performed by exposure. The film thickness of the insulating covering layer 75 on the partition wall 72 is set to 200 nm.

In the embodiment, since the partition wall 72 is covered by the insulating covering layer 75, the partition wall 72 and the common electrode 37 are insulated and it is not necessary to have the voltage applied to the partition wall 72 match that of the common electrode 37. As a result, it is possible to freely apply a voltage to the partition wall 72.

Also, in the case where the partition wall 72 comes into contact with the dispersion medium 21 of the electrophoretic element 32, although it depends on the material, there is a concern that the partition wall 72 will melt when a voltage is applied to the partition wall 72. It is thought that it is possible to prevent this by using, for example, gold (Au) in the formation, but if the configuration is used where the surface of the partition wall 72 formed from the material described above is covered by the insulating covering layer 75, it is advantageous also in terms of cost.

Figure 8:
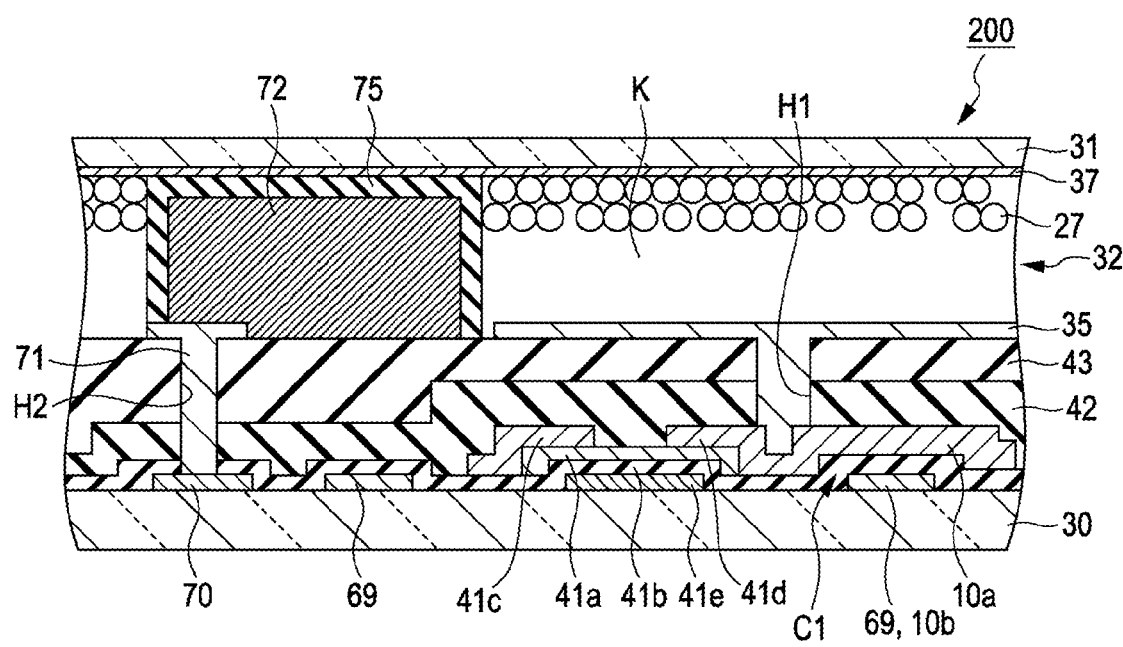
FIG. 8 is a cross-sectional diagram illustrating a display state using the electrophoretic display device of the second embodiment.

FIG. 8 is a cross-sectional diagram illustrating a display state using the electrophoretic display device 200 of the second embodiment.

As shown in FIG. 8, in the electrophoretic display device 200 of the second embodiment, when the same voltage as the pixel electrode 35 is applied to the partition wall 72, the charge particles 27 move to the common electrode 37 side.

Since the partition wall 72 is covered by the insulating covering layer 75, the charge particles 27 do not collect at the partition wall 72 side and effectively move to the common electrode 37 side. As a result, it is possible to execute a brighter white display.

Also, it may be configured so that at least only an upper surface 72a of the partition wall 72 is covered by the insulating covering layer 75. Since the insulating covering layer 75 is provided to electrically insulate the partition wall 72 and the common electrode 37, it is not necessarily necessary to cover the entire surface of the partition wall 72. However, as described above, it is preferable if the insulating covering film 75 is formed to cover the entire body of the partition wall 72 to prevent contact between the partition wall 72 and the dispersion medium 21.

Also, the insulating covering layer 75 (insulator) is not limited to acrylic, and polyimide, other organic insulating materials or inorganic insulating materials may be used.

Figure 9:
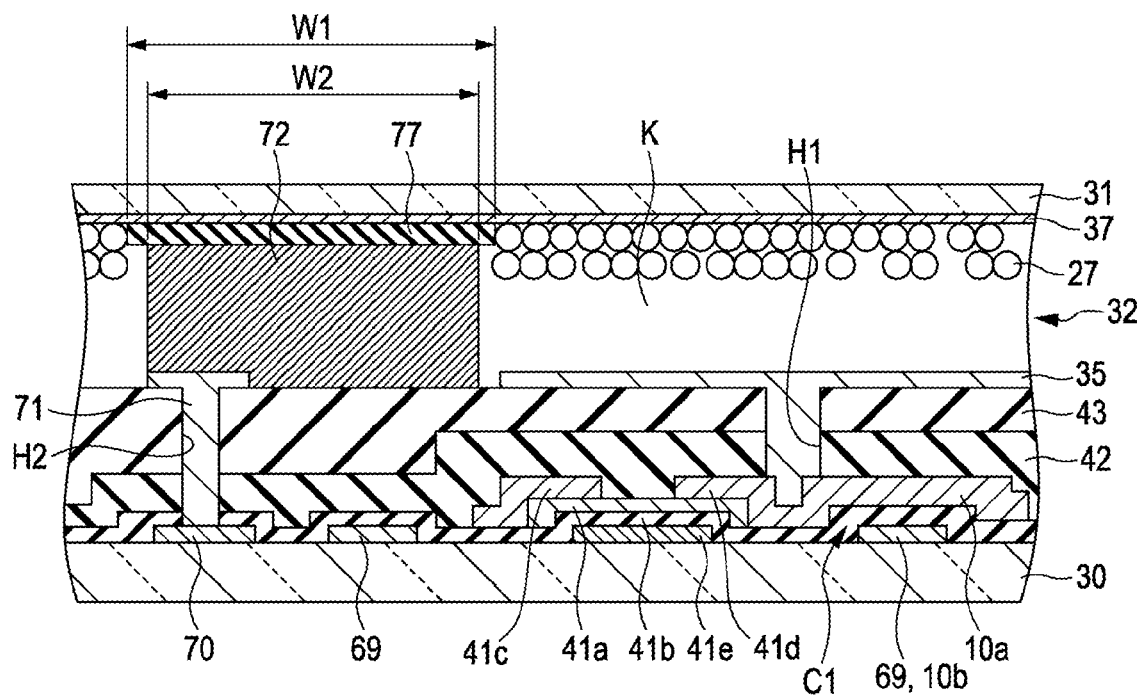
FIG. 9 is a cross-sectional diagram illustrating a modified example of the electrophoretic display device of the second embodiment.

FIG. 9 is a cross-sectional diagram illustrating a modified example of the electrophoretic display device of the second embodiment.

Also, as shown in FIG. 9, the common electrode 37 is formed on the opposing substrate 31 and an insulating layer 77 (insulator) may be provided. By joining the opposing substrate 31 and the element substrate 30 so that the surface of the insulating layer 77 comes into contact with the upper surface of the partition wall 72, the insulation of the partition wall 72 having conductivity and the common electrode 37 is ensured. Here, it is preferable if a width W1 of the insulating layer 77 is formed to be wider than a width W2 of the partition wall 72 and is formed in a size so that the edge portion thereof protrudes more to the outside than the partition wall 72. As a result, when the opposing substrate 31 and the element substrate 30 are joined, the alignment of the partition wall 72 and the insulating layer 77 is easy.

Third Embodiment

Next, an electrophoretic display device 300 of a third embodiment will be described.

Figure 10:
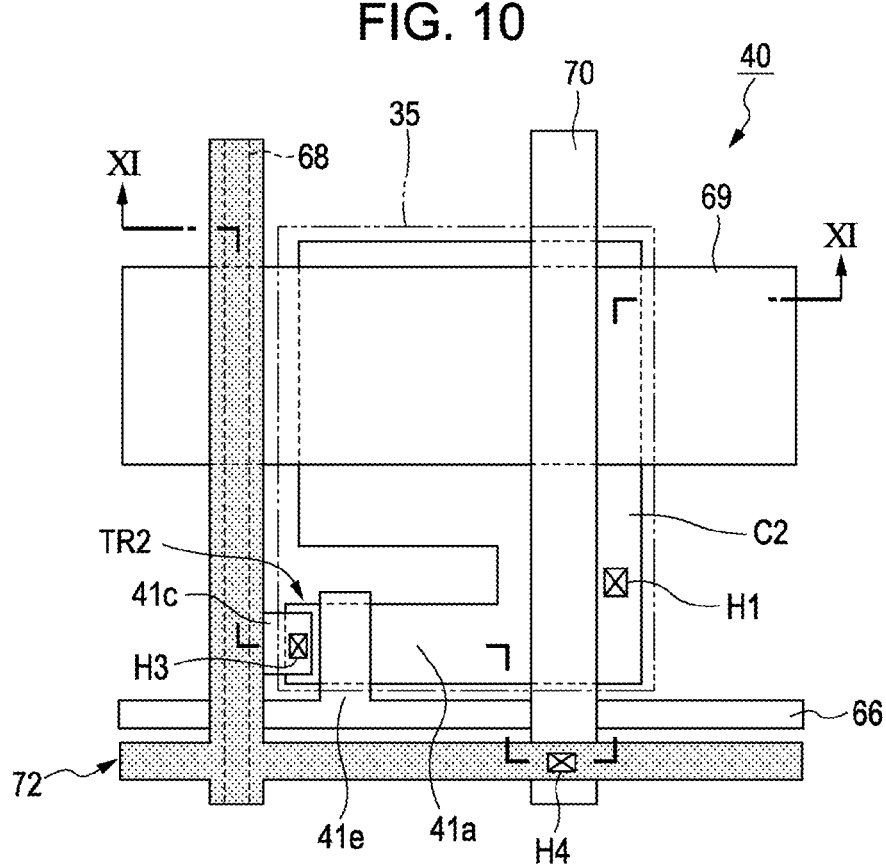
FIG. 10 is a planar diagram illustrating a schematic configuration of one pixel of an electrophoretic display device of a third embodiment.
Figure 11:
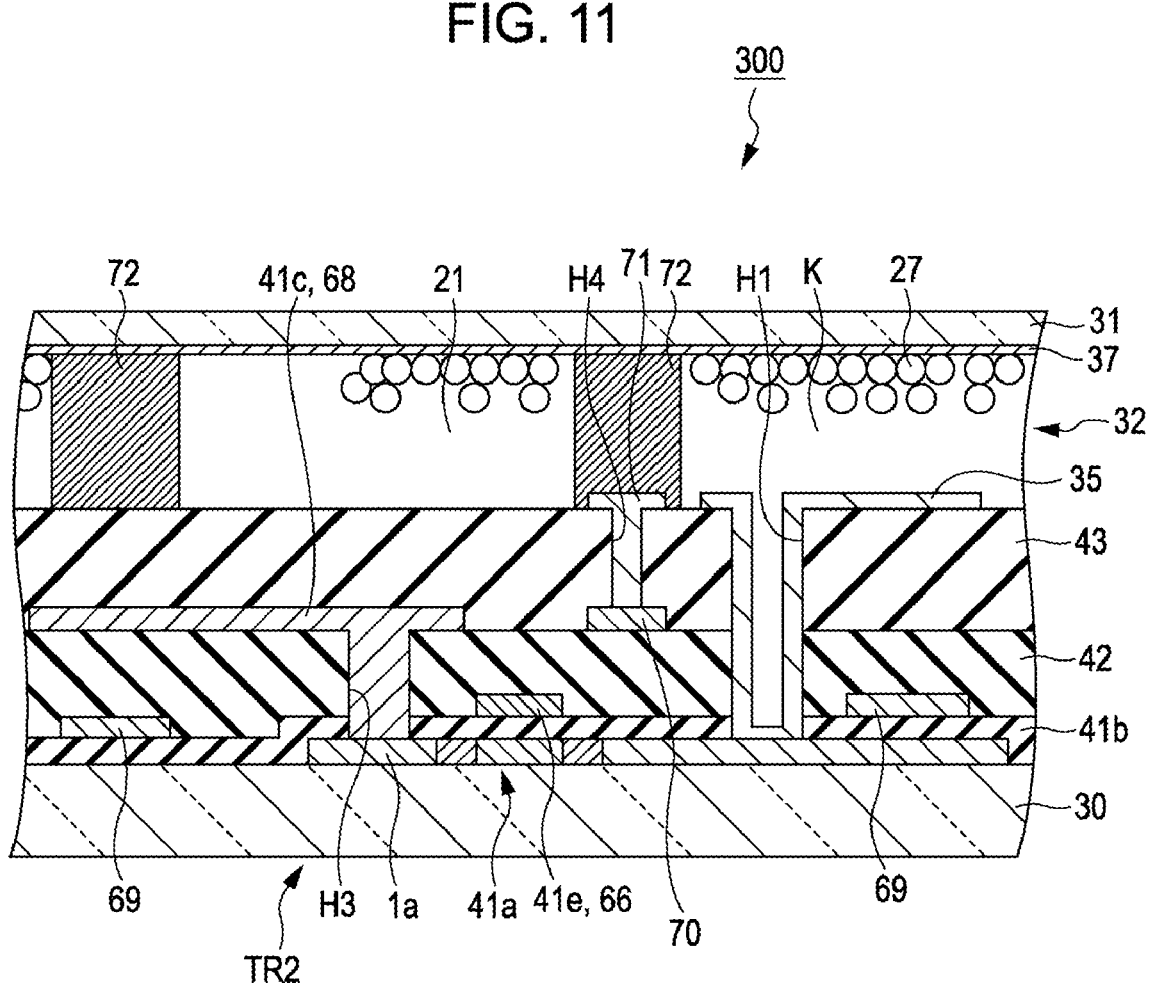
FIG. 11 is a cross-sectional diagram taken along a line XI-XI of FIG. 10.

FIG. 10 is a planar diagram illustrating a schematic configuration of one pixel of the electrophoretic display device 300 of the third embodiment, and FIG. 11 is a cross-sectional diagram taken along a line XI-XI of FIG. 10.

In the previous embodiments, the partition wall voltage lines 70 are formed to extend in parallel with the scanning lines 66. However, in the electrophoretic display device 300 of the third embodiment, as shown in FIG. 10, the partition wall voltage lines 70 are formed to extend in parallel with the data lines 68.

Also, as shown in FIG. 11, the partition wall voltage line 70 is formed on the surface of the first interlayer insulating layer 42 along with the data line 68 and a source electrode 41c of a selection transistor TR2 with a top gate structure. The source electrode 41c is connected to a source region 1a of the semiconductor layer 41a via a contact hole H3 formed in the first interlayer insulating film 42.

The partition wall voltage line 70 is connected to the partition wall 72 arranged between the element substrate 30 and the opposing substrate 31 via the relay electrode 71 formed in a contact hole H4 in the second interlayer insulating film 43.

Also, the electrophoretic display device 300 of the embodiment is provided with an electrophoretic element 32 formed from the black dispersion medium 21 and charge particles 27 which are colors other than white or black between the element substrate 30 and opposing substrate 31. The electrophoretic element 32 is where the charge particles 27 which have different colors (R, G, B) for each pixel are sealed and one pixel is configured by, for example, R, G, B sub-pixels.

In the embodiment, the partition wall voltage lines 70 are formed in the same layer as the data lines 68 and the source electrodes 41c. In this case, since it is possible to carry out the formation in the same process as the data lines 68 and the electrodes of the selection transistors TR2, it is not necessary to add a process for forming the partition wall voltage lines 70.

Next, a manufacturing method of the electrophoretic display device of the third embodiment will be described.

FIGS. 12A to 14J are cross-sectional diagrams illustrating manufacturing processes of the electrophoretic display device of the embodiment.

Figure 12A:
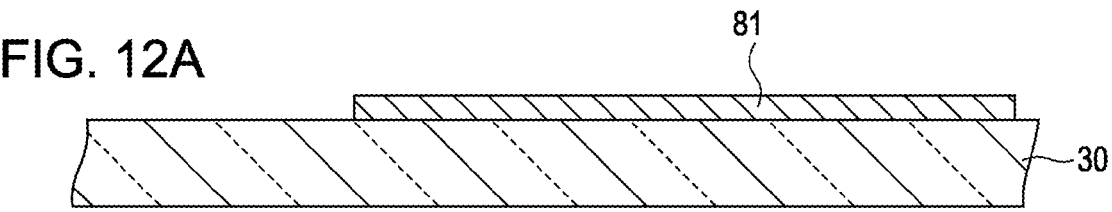
FIGS. 12A to 12D are partial cross-sectional diagrams illustrating manufacturing processes of the electrophoretic display device of the third embodiment.

As shown in FIG. 12A, on an insulating substrate formed from glass, a SINx film, an amorphous Si film and a $SiO_2$ film are continuously deposited to a thickness of 50 nm using a plasma CVD (P-CVD) method, and in regard to this laminated film 81, dehydrogenation annealing of the amorphous Si is performed at 350 degrees. After this, crystallization of the amorphous Si film is performed using a laser annealing device.

Figure 12B:
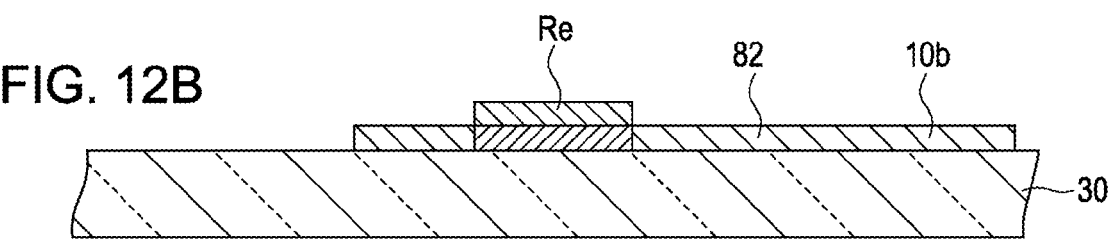

As shown in FIG. 12B, after this, a region which becomes a channel and an LDD is covered by a resist Re, P is ion-implanted, and an $N^+$ region 82 of the selection transistor TR2 and one electrode 10b (lower electrode) of the holding capacitor C1 are formed.

Figure 12C:
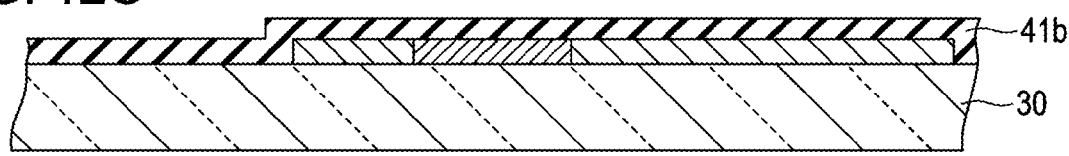

As shown in FIG. 12C, an $SiO_2$ film with a thickness of 80 nm and a SINx film with a thickness of 20 nm are continuously deposited using a plasma CVD method and become the gate insulating film 41b. The gate insulating film 41b also functions as the insulating film of the holding capacitor C1.

Figure 12D:
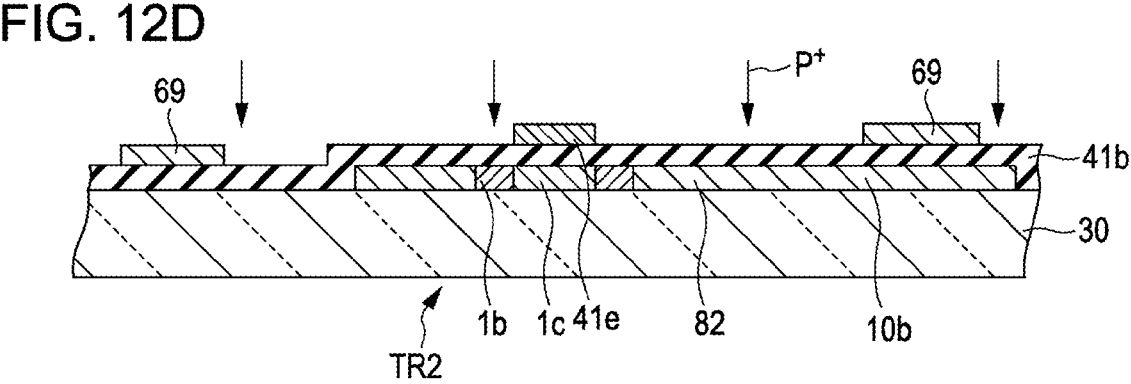

As shown in FIG. 12D, after the gate electrode 41e and the holding capacitance line 69 formed from Al with a thickness of 400 nm are deposited using a sputtering method, a pattern is formed using photo-etching. Furthermore, to form a LDD 1b, P ions are ion-implanted with the gate electrode 41e as a mask without covering a resist. As a result, the selection transistor TR2 which is self-aligning is formed.

Figure 13E:
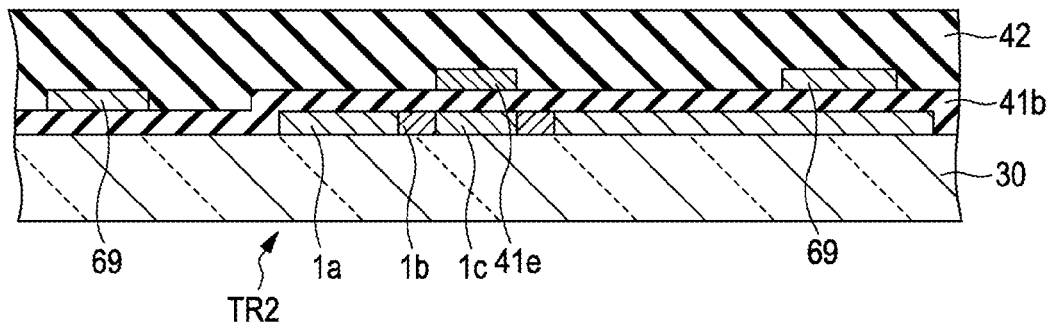
FIGS. 13E to 13G are partial cross-sectional diagrams illustrating manufacturing processes of the electrophoretic display device of the third embodiment.

As shown in FIG. 13E, the first interlayer insulating film 42 formed from an $SiO_2$ film with a thickness of 300 nm is formed using a plasma CVD method.

Figure 13F:
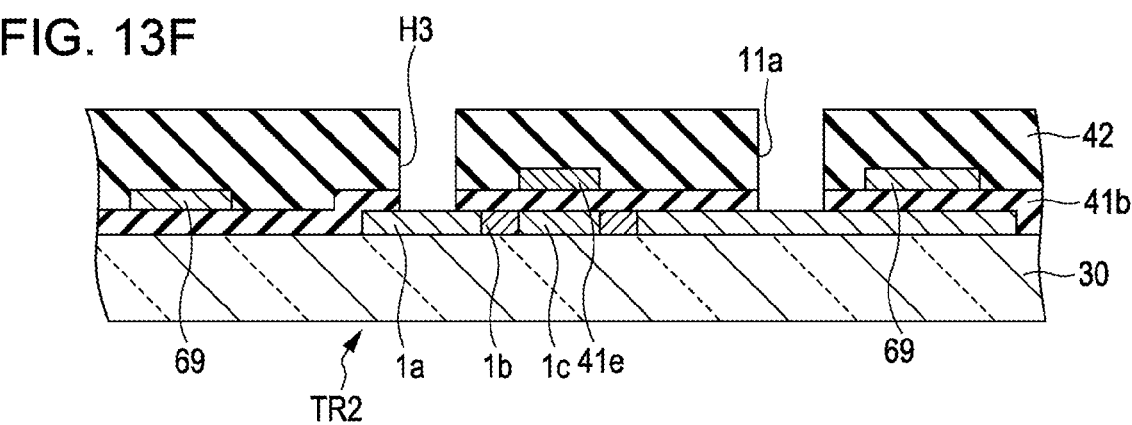

As shown in FIG. 13F, the contact hole H3 and the through hole 11a which penetrate through the first interlayer insulating film 42 and the gate insulating film 41b are formed using photo-etching and dry etching.

Figure 13G:
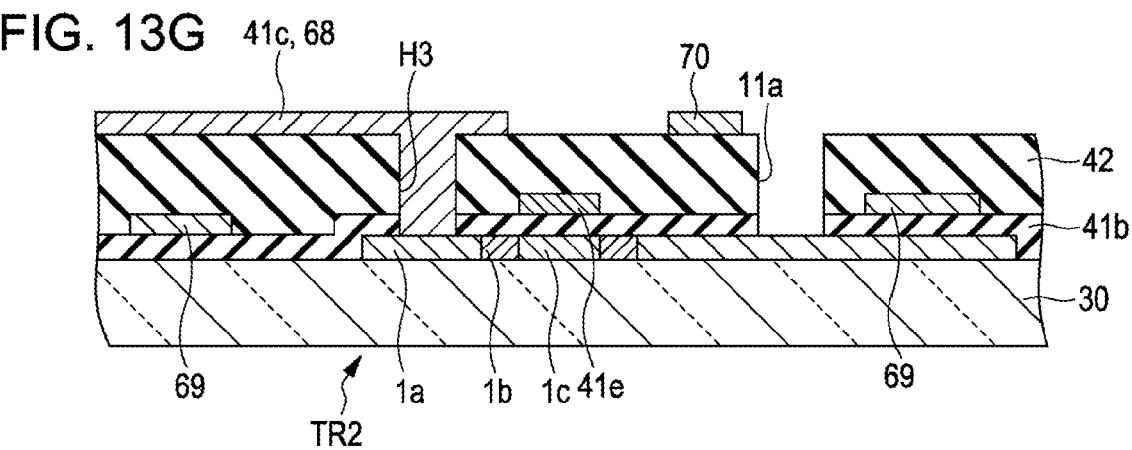

As shown in FIG. 13G, the source electrode 41c, the data line 68, and the partition wall voltage line 70 formed from aluminum with a thickness of 400 nm are deposited using a sputtering method and are formed in a photo-etching process. The source electrode 41c is connected to the source region 1a of the semiconductor layer 41a via the contact hole H3.

Figure 14H:
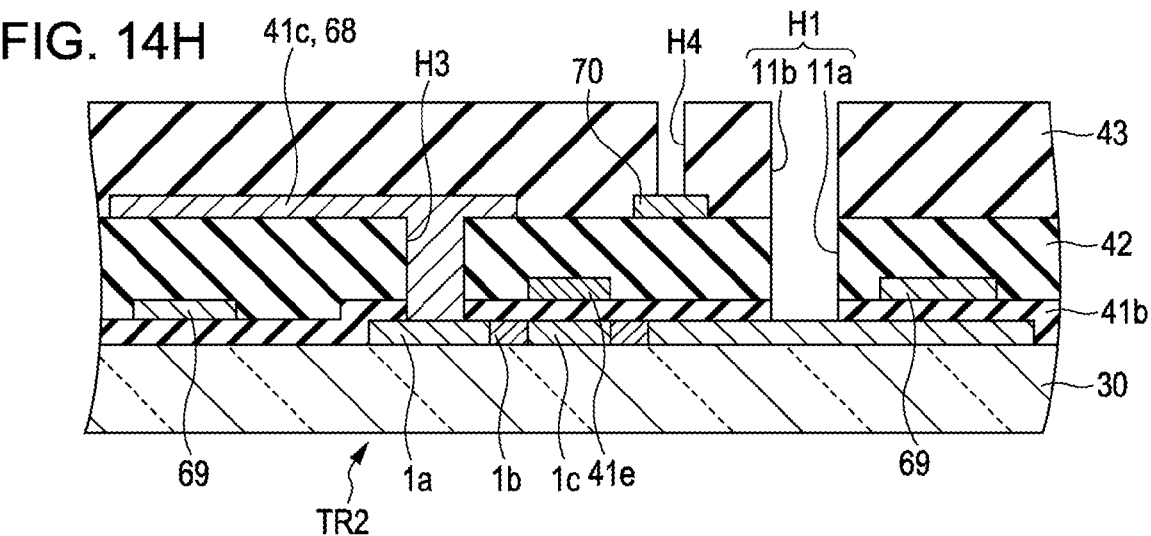
FIGS. 14H to 14J are partial cross-sectional diagrams illustrating manufacturing processes of the electrophoretic display device of the third embodiment.

As shown in FIG. 14H, the second interlayer insulating film 43 formed from acrylic with a thickness of 1.7 μm is formed on the first interlayer insulating film 42 using a coating method. As the acrylic material has photosensitivity, firstly, after the contact hole H4 and the through hole 11b are formed in the second interlayer insulating film 43 using photo, the acrylic material filled into the through hole 11a of the first interlayer insulating film 42 is removed with the second interlayer insulating film 43 as a mask and the contact hole H1 is formed.

Figure 14I:
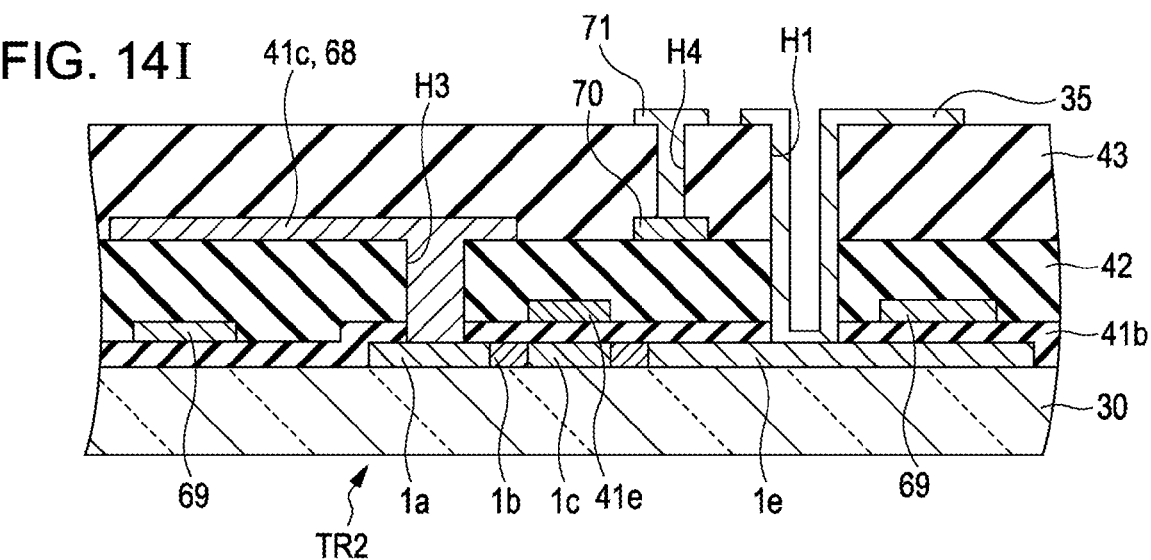

As shown in FIG. 14I, ITO with a thickness of 50 nm is deposited using a sputtering method and the pixel electrode 35 and the relay electrode 71 are formed in a pattern using a photo-etching process. The pixel electrode 35 is connected to a drain region 1e of the selection transistor TR2 via the contact hole H1 and the relay electrode 71 is connected to the partition wall voltage line 70 via the contact hole H4.

Figure 14J:
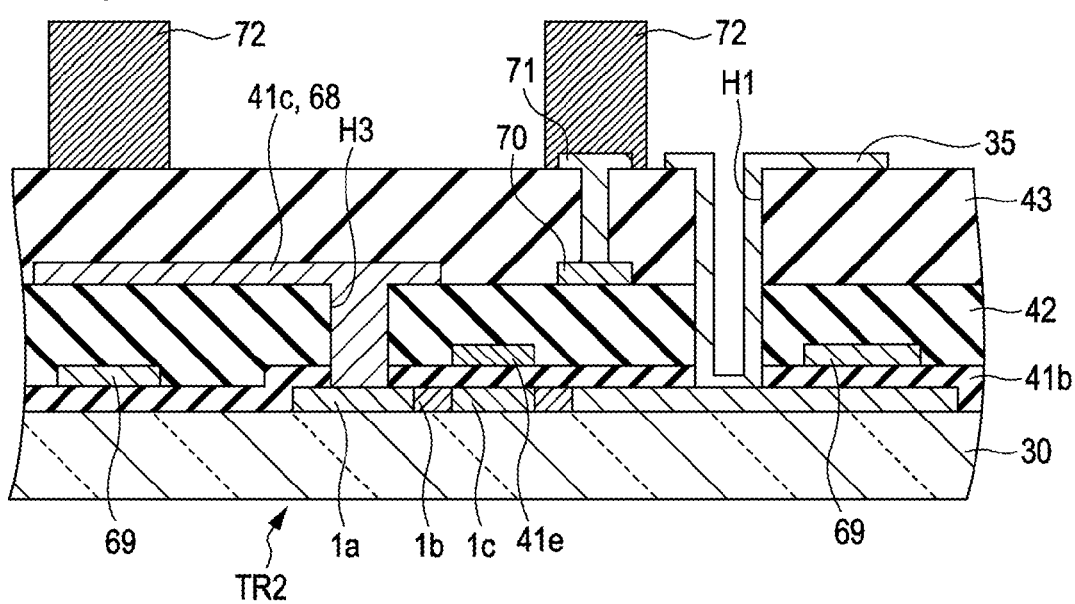

As shown in FIG. 14J, the partition wall 72 is formed from a material where carbon is mixed with photoactive polyimide and which has conductivity. After coating using a spin coating method, the partition wall 72 is formed by exposure, development and firing. Here, a specific resistance which is in the order of $10^{-4}$ Ωcm is used.

After this, in the space surrounded by the partition wall 72 formed on the element substrate 30, the white charge particles 27 mixed in the black dispersion medium 21 are arranged as the electrophoretic material, and then the electrophoretic display device 300 of the embodiment as shown in FIG. 11 is completed by joining the element substrate 30 and the opposing substrate 31.

According to the embodiment, the partition wall voltage lines 70 are formed to extend in parallel with the data lines 68. In the case of the configuration where the partition wall voltage lines 70 extend in parallel with the scanning lines 66, the holding capacitor C1 is reduced. As in the first embodiment described above, if the partition wall voltage lines 70 are formed in the same layer as the scanning lines 66 and the holding capacitance lines 69, since an area is required to arrange the partition wall voltage lines 70 in parallel with the scanning lines 66, to that extent, the area for forming the holding capacitor C1 (that is, the holding capacitance lines 69) is reduced.

In regard to this, by extending the partition wall voltage lines 70 in parallel with the data lines 68 as in the embodiment, it is possible to secure a sufficient formation area of the holding capacitor C1 (the holding capacitance lines 69) and it is possible to prevent a reduction in the capacitance of the holding capacitor C1.

Also, in the case where the partition wall voltage lines 70 are in parallel with the data lines 68, there are no intersections with the data lines 68. Since most of the power consumption is free discharge with regard to the data lines 68, the parasitic capacitance at the intersections is increased. However, in the embodiment, since there are no intersections between the partition wall voltage lines 70 and the data lines 68, it is possible to reduce power consumption.

Above, the preferable embodiments according to the invention are described while referring to the attached diagrams, but it is needless to say that the invention is not limited to these examples. It should be understood by those skilled in the art that various modifications and alterations are possible within the scope of the technical concepts disclosed within the claims and these will also of course be included in the technical scope of the invention.

For example, in each of the embodiments of the invention, the members configuring each of the embodiments are not limited to those described above. As the element substrate 30 and the opposing substrate 31, organic materials other than PET or inorganic materials other than glass may be used. To configure the source electrode 41c, the drain electrode 41d and the gate electrode 41e, a metal other than Al or an organic material may be used. Also as the semiconductor material, other than a-IGZO, an oxide semiconductor such as AGZO, ZnO or AZO, an organic semiconductor material, or an inorganic semiconductor material such as amorphous hydride or polycrystalline silicon may be used. As the various insulating films, an inorganic insulating material or an organic insulating material other than those described above may be used.

Also, the film thickness of each of the layers may be a thickness other than those described above.

The manufacturing methods are not limited to plasma CVD methods, sputtering methods, or photo-etching methods. An application method such as ink jet may be used.

Also, the second interlayer insulating film 43 is not necessarily necessary, and the second interlayer insulating film 43 may not be included if the planarization of the surface (the surface formed by the pixel electrode 35) is possible using the first interlayer insulating film 42.

In the description above, the partition wall 72 and the insulating covering layer 75 are provided to come into contact with the common electrode 37. However, the configuration is not limited to this and the partition wall 72 or the insulating covering layer 75 may be formed in a state having a specific gap between it and the common electrode 37. Even if the height is such so as not to come into contact with the common electrode 37, it is possible to shield the inclined electric field and reduce defects in the display.

Electronic Apparatus

Next, cases are described where the electrophoretic display devices 100 to 300 of each of the embodiments described above are applied to electronic apparatuses.

Figure 15A:
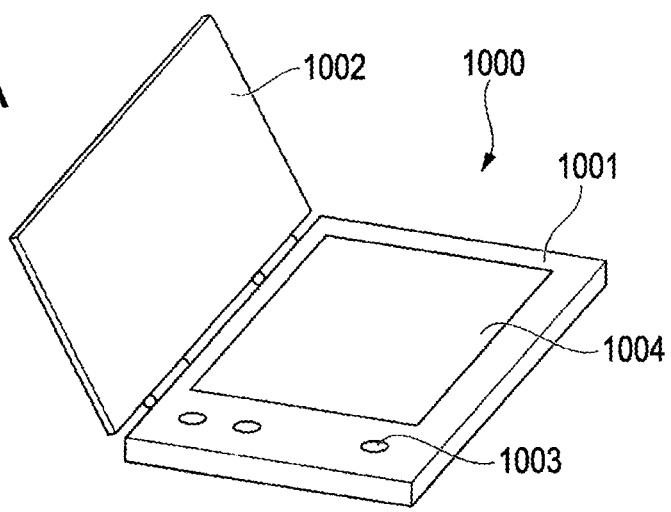
FIGS. 15A to 15C are diagrams illustrating examples of electronic apparatuses.
Figure 15B:
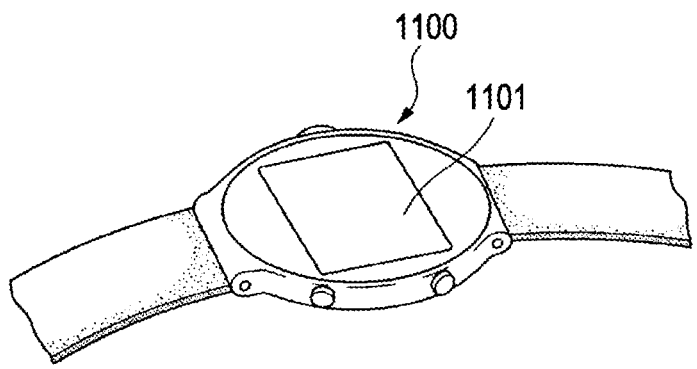
Figure 15C:
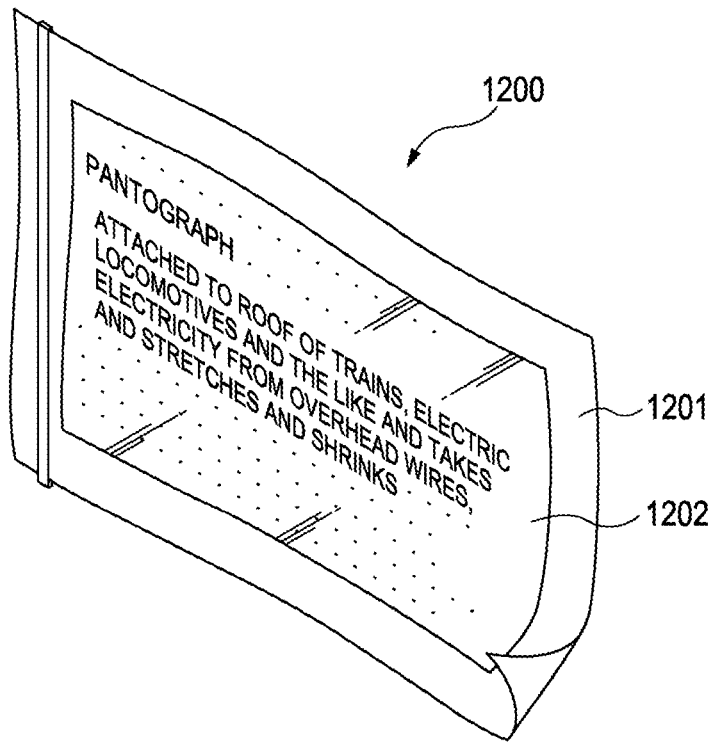
Figure 16A:
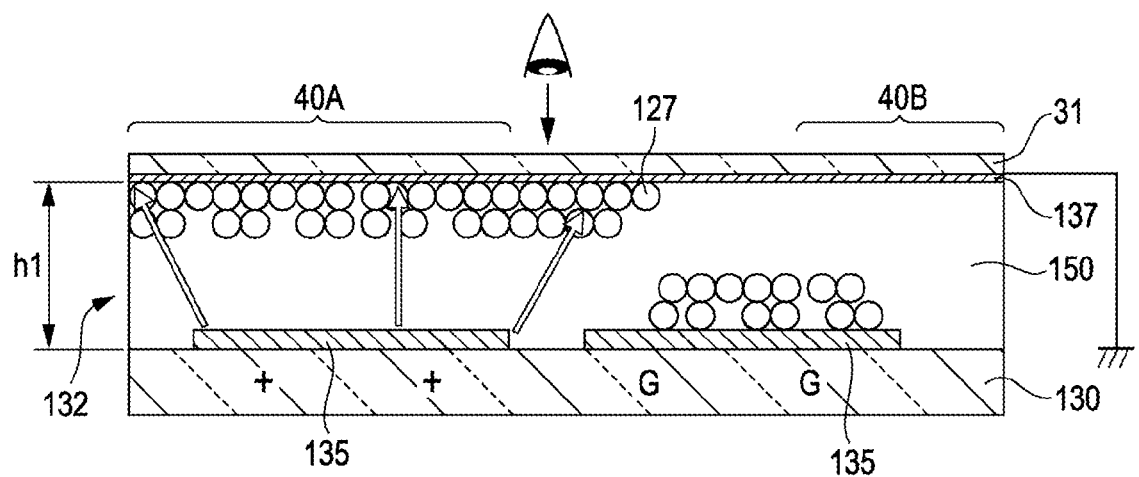
FIGS. 16A and 16B are cross-sectional diagrams illustrating an electrophoretic display device of the related art.
Figure 16B:
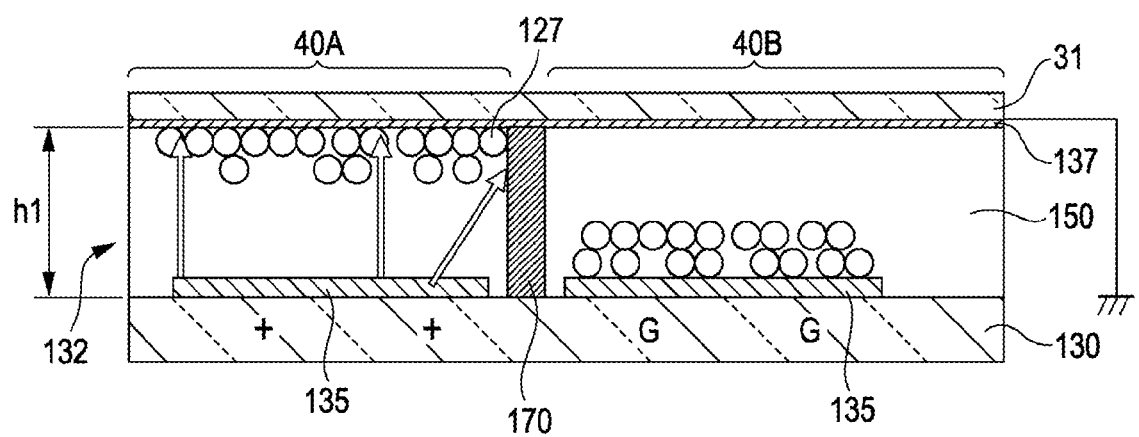

FIGS. 15A to 15C are perspective diagrams describing specific examples of electronic apparatuses where the electrophoretic display device of the invention has been applied.

FIG. 15A is a perspective diagram illustrating an electronic book which is an example of the electronic apparatus. An electronic book 1000 is provided with a frame 1001 with a book shape, a cover 1002 (able to be opened and closed) provided to freely rotate with regard to the frame 1001, an operation section 1003, and a display section 1004 configured using the electrophoretic display device of the invention.

FIG. 15B is a perspective diagram illustrating a wrist watch which is an example of the electronic apparatus. A wrist watch 1100 is provided with a display section 1101 configured using the electrophoretic display device of the invention.

FIG. 15C is a perspective diagram illustrating an electronic paper which is an example of the electronic apparatus. An electronic paper 1200 is provided with a body section 1201 configured using a rewriteable sheet having the same feeling and flexibility as paper and a display section 1202 configured using the electrophoretic display device of the invention.

For example, since it is supposed that a purpose of the electronic book and the electronic paper and the like is to have characters repeatedly written onto a white background, it is necessary to resolve residual images when erasing and residual images over time.

In addition, the range of electronic apparatuses to which the electrophoretic display device of the invention can be applied is not limited to these and broadly includes apparatuses which use a visual change in color tone accompanying movement of charge particles.

According to the electronic book 1000, the wrist watch 1100 and the electronic paper 1200 above, since the electrophoretic display device according to the invention is adopted, an electronic apparatus is provided with a low power consumption display means.

In addition, the electronic apparatuses described above exemplify the electronic apparatuses according to the invention and do not limit the technical scope of the invention. For example, it is possible to appropriately use the electrophoretic display device according to the invention also in display sections of electronic apparatuses such as a mobile phone or a portable audio device.

What is claimed is:

1. An electrophoretic display device comprising:
a first substrate;
a second substrate arranged to face the first substrate;

an electrophoretic element arranged between the first substrate and the second substrate;
a plurality of pixel electrodes formed between the electrophoretic element and the first substrate;
an opposing electrode formed between the electrophoretic element and the second substrate, the opposing electrode facing the plurality of pixel electrodes;
a voltage line formed between the electrophoretic element and the first substrate;
a partition wall having conductivity which is arranged between the first substrate and the second substrate and electrically connected to the voltage line; and
an insulator arranged between the partition wall and the opposing electrode, the partition wall being electrically separated from the opposing electrode.

2. The electrophoretic display device according to claim 1, wherein, the surface of the partition wall is covered by the insulator.

3. The electrophoretic display device according to claim 1, wherein, there is a plurality of scanning lines and a plurality of data lines which extend in directions which intersect each other on the surface of the electrophoretic element side of the first substrate, and
the voltage line extends in parallel to at least any one of the scanning lines or the data lines.

4. The electrophoretic display device according to claim 1, wherein, a relay electrode is provided which is connected to the voltage line on the first substrate, and
the voltage line is connected to the partition wall via the relay electrode.

5. The electrophoretic display device according to claim 1, wherein, the relay electrode is formed in the same layer as the pixel electrodes.

6. The electrophoretic display device according to claim 1, wherein, the partition wall is black.

7. The electrophoretic display device according to claim 1, wherein, the partition wall and the voltage line are connected at a plurality of connection points provided for each pixel.

8. The electrophoretic display device according to claim 1, wherein, the partition wall is formed to surround the pixel electrodes in a planar view.

9. An electronic apparatus comprising the electrophoretic display device according to claim 1.

10. An electronic apparatus comprising the electrophoretic display device according to claim 2.

11. An electronic apparatus comprising the electrophoretic display device according to claim 3.

12. An electronic apparatus comprising the electrophoretic display device according to claim 4.

13. An electronic apparatus comprising the electrophoretic display device according to claim 5.

14. An electronic apparatus comprising the electrophoretic display device according to claim 6.

15. An electronic apparatus comprising the electrophoretic display device according to claim 7.

16. An electronic apparatus comprising the electrophoretic display device according to claim 8.

* * * * *